United States Patent
Segelken et al.

(10) Patent No.: US 6,735,682 B2
(45) Date of Patent: May 11, 2004

(54) APPARATUS AND METHOD FOR ADDRESS CALCULATION

(75) Inventors: Ross A. Segelken, Portland, OR (US); Feng Chen, Portland, OR (US); David J. Sager, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 192 days.

(21) Appl. No.: 10/112,254

(22) Filed: Mar. 28, 2002

(65) Prior Publication Data

US 2003/0188125 A1 Oct. 2, 2003

(51) Int. Cl.[7] .............................................. G06F 12/00
(52) U.S. Cl. ...................................................... 711/220
(58) Field of Search ................................. 711/214, 215, 711/212, 219, 220

(56) References Cited

U.S. PATENT DOCUMENTS 6,209,076 B1 * 3/2001 Blomgren .................... 711/214

OTHER PUBLICATIONS

U.S. patent application Ser. No. 09/454,076, Single Cicyle, filed Dec. 2, 1999.

* cited by examiner

Primary Examiner—Kevin L. Ellis
(74) Attorney, Agent, or Firm—Blakely, Sokoloff, Taylor & Zafman LLP

(57) ABSTRACT

A dual-cycle address generation unit is described to generate linear addresses. The dual-cycle address generation unit includes a first adder to add a product of an index and a scaling factor to an offset and a segment base during a first clock cycle and a second adder to add output of the first adder with a base during a second clock cycle.

21 Claims, 4 Drawing Sheets

APPARATUS AND METHOD FOR ADDRESS CALCULATION

BACKGROUND

1. Field

Embodiments of the invention relate to the field of microprocessors, and more specifically, to a circuit and method for address calculation.

2. Background

In computer systems, there are several different varieties of addressing reflecting different levels of abstraction, such as linear and physical addresses. The linear address may be calculated based on four components: Segment base, Base, Scaled Index and Offset.

Microprocessors typically include an address generating unit (AGU) to perform address calculations. FIG. 4 depicts simplified representation of a conventional single-cycle AGU for generating linear addresses. The circuitry shown in FIG. 4 carries out the following calculation to determine a linear address:

$$\text{Address} = [\text{Base} + (\text{Index} \ast \text{Scale}) + \text{Offset}] + \text{Segment Base} \quad (1)$$

As shown above, to compute the linear address, the conventional AGU 400 first receives Base 402, Index 404 multiplied by a Scaling factor (Scale) 420 and Offset 406 inputs via communications lines into the first 3:2 adder 412. The multiplication of the Index 404 by the scaling factor 420 is carried out by a shifter 410. The shifter 410 can be used for the multiplication because the Scaling factors 420 are constrained to be equal to $2^N$, where N is a positive integer or zero. The output signals 422,424 generated by the first 3:2 adder 412 are inputted into the second 3:2 adder 414 along with the Segment Base 408 input. Then a 2:1 adder 416 receives the output signals 426,428 generated by the second 3:2 adder 414 and outputs the linear address 418 in accordance with the equation (1). Accordingly, the conventional single-cycle AGU is configured to add the Base, Scaled Index and Offset together first before adding the Segment base.

To achieve higher performance, clock frequencies operating in processors continue to increase. In the past, AGUs were accustomed to performing address calculation in one clock cycle. Advances in microprocessor technology have led to shorter and shorter clock cycles. AGUs operating at higher clock frequencies may require multiple clock cycles to perform address calculation.

BRIEF DESCRIPTION OF THE DRAWINGS

The invention may best be understood by referring to the following description and accompanying drawings that are used to illustrated embodiments of the invention. In the drawings.

DETAILED DESCRIPTION

In the following description, specific details are set forth. However, it is understood that embodiments of the invention may be practiced without these specific details. In other instances, well-known circuits, structures and techniques have not been shown in detail in order to avoid obscuring the understanding of this description.

Figure 1:
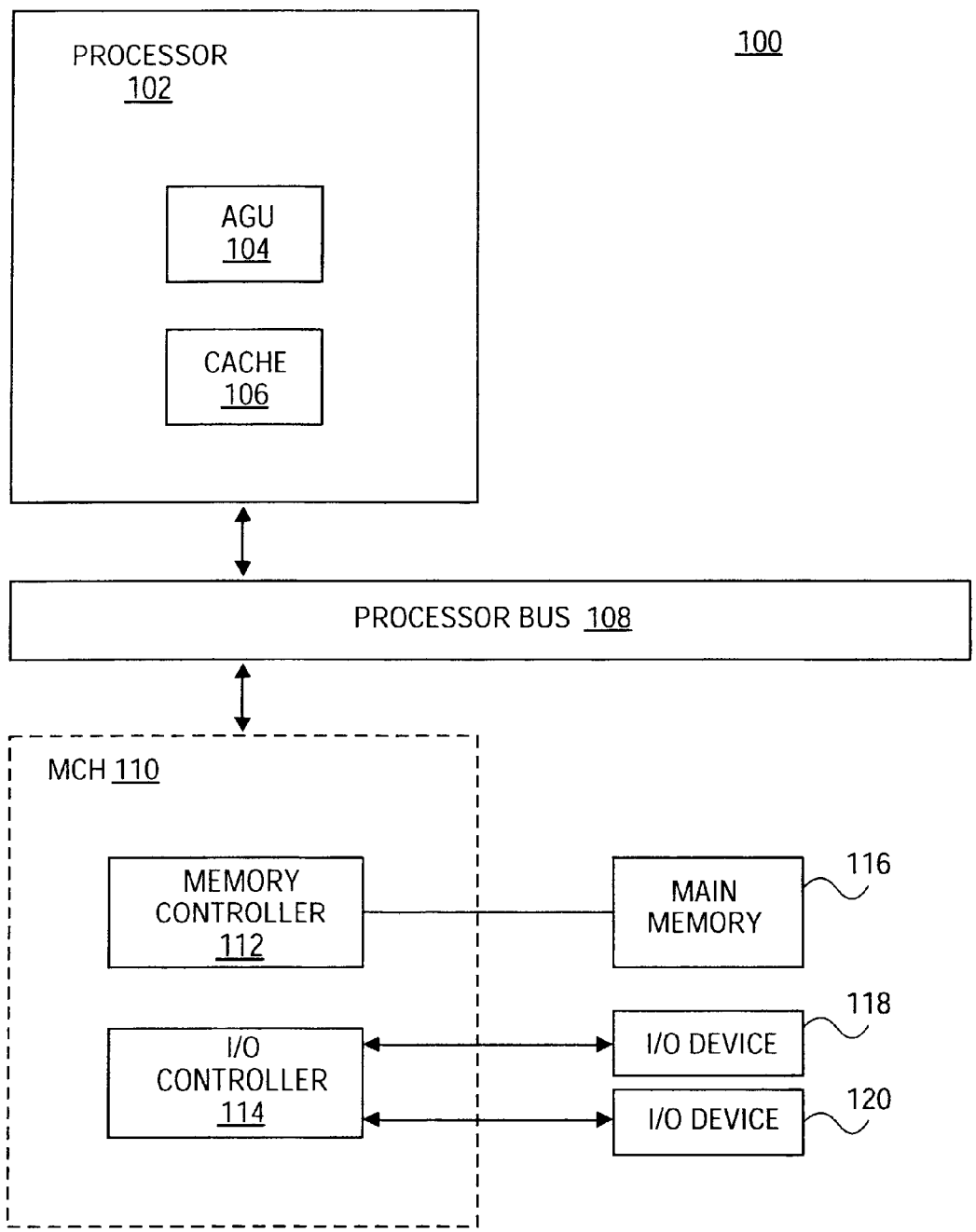
FIG. 1 shows a block diagram of an embodiment of a computer system employing the present invention.

FIG. 1 depicts an embodiment of a computer system 100 employing the present invention. The computer system 100 includes a processor 102 coupled a processor bus 108. In one embodiment, the processor 102 is a processor from the Pentium® family of processors available from Intel Corporation of Santa Clara, Calif. However, the processor 102 may be of any other type, such a complex instruction set of computer ("CISC"), reduced instruction set computer ("RISC"), very long instruction word ("VLIW"), or hybrid architecture.

The processor 102 may include, among other things, a cache memory 106 and an address generation unit (AGU) 104 configured to perform address computations. The cache memory 106 may comprise a first level (L0) cache memory and a second level (L1) cache memory. The L0 and L1 cache memories can be integrated into a single device. Alternatively, the L1 cache memory may be coupled to the processor by a shared bus. In one embodiment, the cache memory 106 is a unified cache, one that stores both instruction, data and variable data (collectively, "data").

Coupled to the processor bus 108 is a memory controller hub (MCH) 110. The MCH 110 includes a memory controller 112 and an I/O controller 114. In the illustrated embodiment, a main memory 116 is coupled to the processor bus 108 through the MCH 110. The main memory 116 and the cache memory 106 store sequences of instructions and data that are executed by the processor 102. In one embodiment, the main memory 116 includes a dynamic random access memory (DRAM); however, the main memory 116 may have other configurations. Additional device may also be coupled to the memory controller hub 110, such as multiple main memory devices. The MCH 110 coordinates data transfer to and from the main memory 116 at the request of the processor and/or I/O devices 118, 120. Data and/or sequences of instructions executed by the processor may be retrieved from the main memory, the cache memories, the prefetch buffer or other storage devices. The computer system 100 is described in terms of a single processor; however, multiple processors can be coupled to the processor bus.

Figure 2:
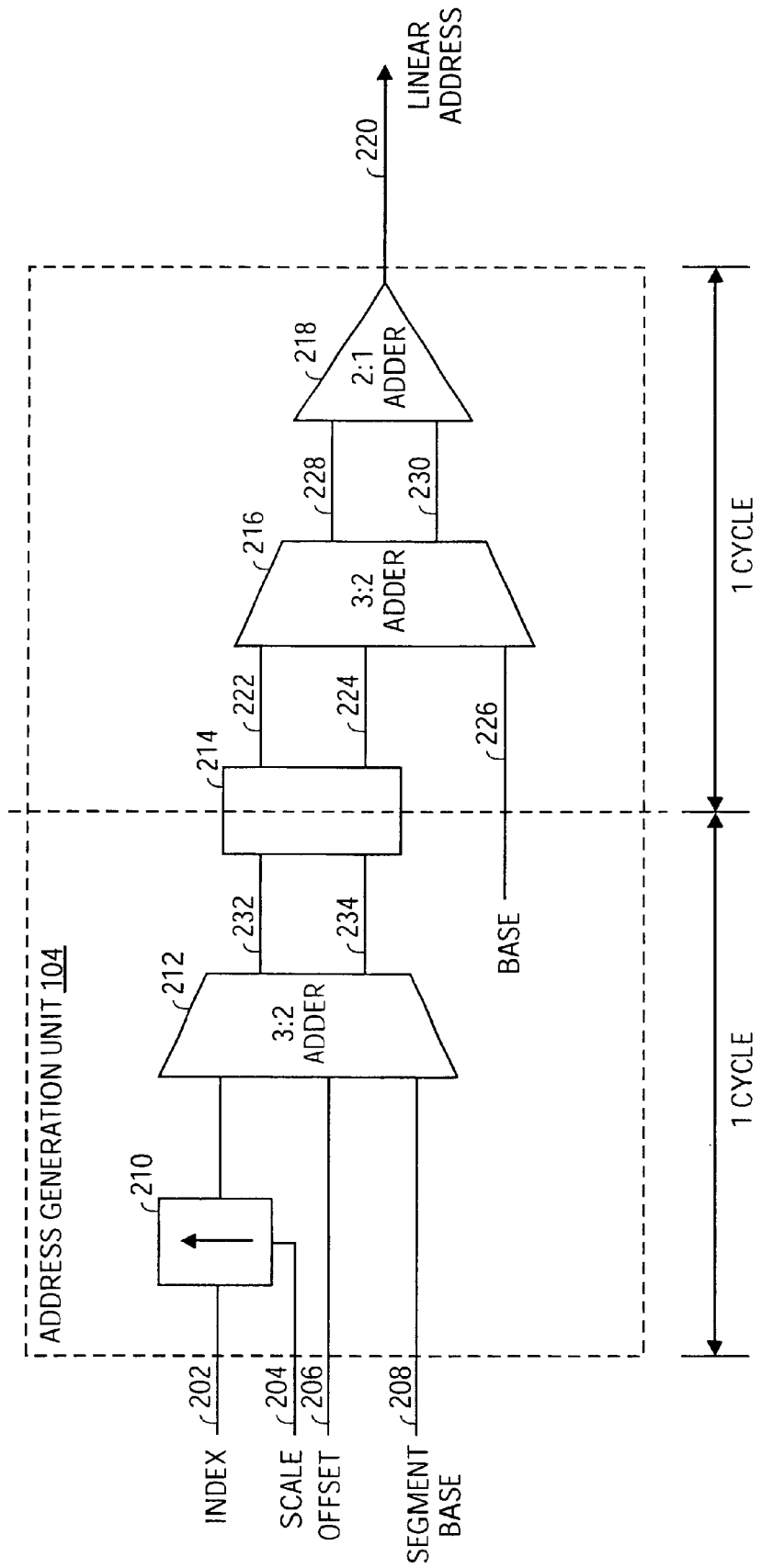
FIG. 2 shows a block diagram of a dual-cycle address generation unit according to one embodiment of the present invention.

FIG. 2 depicts a portion of a dual-cycle address generation unit (AGU) 104 according to one embodiment of the present invention to generate linear addresses for memory operations based on a base address (Base) 226, a displacement value (Offset) 206, a scaling factor (Scale) 204, and index value (Index) 202 and a segment base value (Segment base) 208. The Scale 204 and Offset 206 values are constant values and may be provided in the instruction itself. The base 226 and index 202 values used for generating the linear address may be obtained from base and index registers in a register file. The segment base 208 contains the starting address of the desired memory segment and is accessible by the AGU.

The dual-cycle AGU 104 shown in FIG. 2 carries out the following calculation to determine a linear address:

$$\text{Linear Address} = [(\text{Index} \ast \text{Scale}) + \text{Offset} + \text{Segment base}] + \text{Base} \quad (2)$$

In linear address calculation, a number of address components are added to determine the final address. According to one embodiment, the address components are added in certain order, which takes into consideration that data associated with different address components are available at different times. It has been found that Base 226 is more often used than the Index 202, i.e., the value of Index 202 is often zero. As a result, the value of Index 202 is usually known to the AGU 104 before the Base 226 becomes available. Because values associated with other address components are available to the AGU 104 prior to the Base, the dual-cycle address computation schedules the address computation operation to begin one clock cycle before the Base 226 becomes available. By adding the value of the Base 226 last, performance may be gained by taking advantage of situations when the Index 202 is available before the Base 226 or when the Index 202 is not being used.

As shown in FIG. 2, the Segment base 208, Index 202 and Offset 206 are added during the first clock cycle and the Base 226 is added to the first summation during the second clock cycle. The multiplication of the Index 202 by the Scaling factor (Scale) 204 may be carried out by a shifter 210. The shifter 210 can be used for the multiplication because the Scaling factors 204 are constrained to be equal to $2^N$, where N is a positive integer or zero. The product of the Index 202 and the Scaling factor 204 is added to the Offset 206 and the Segment base 208 via a first 3:2 adder 212 during the first clock cycle. Then, during the subsequent clock cycle, the outputs 232, 234 of the first 3:2 adder 212 are inputted into the second 3:2 adder 216 along with the Base 226. The outputs 228, 230 of the second 3:2 adder 216 are then provided to a 2:1 adder 218. The result from the 2:1 adder 218 is thus the calculated linear address 220.

According to an embodiment of the present invention, the dual-cycle AGU 104 is pipelined to carry out the address computation in two clock cycles. In one embodiment, the outputs 232 of the first 3:2 adder 212 are stored in a buffer 214 at the end of the first cycle, so that during the next clock cycle, the first stage of the pipeline can immediately start executing the next operation while the original operation proceeds to the second stage.

Figure 3:
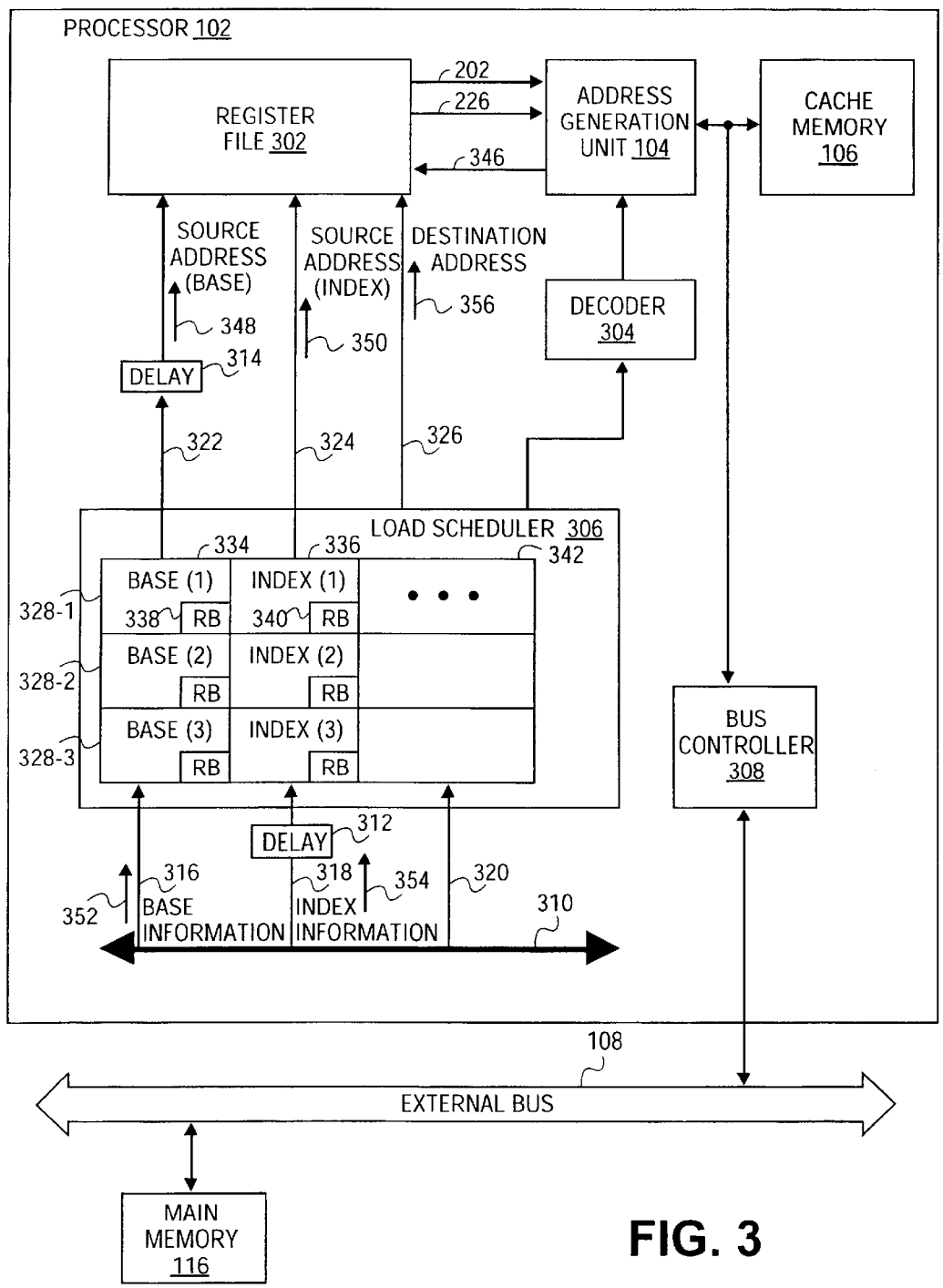
FIG. 3 shows a block diagram of portions of a processor implementing a dual cycle address calculation arrangement according to one embodiment of the invention.
Figure 4:
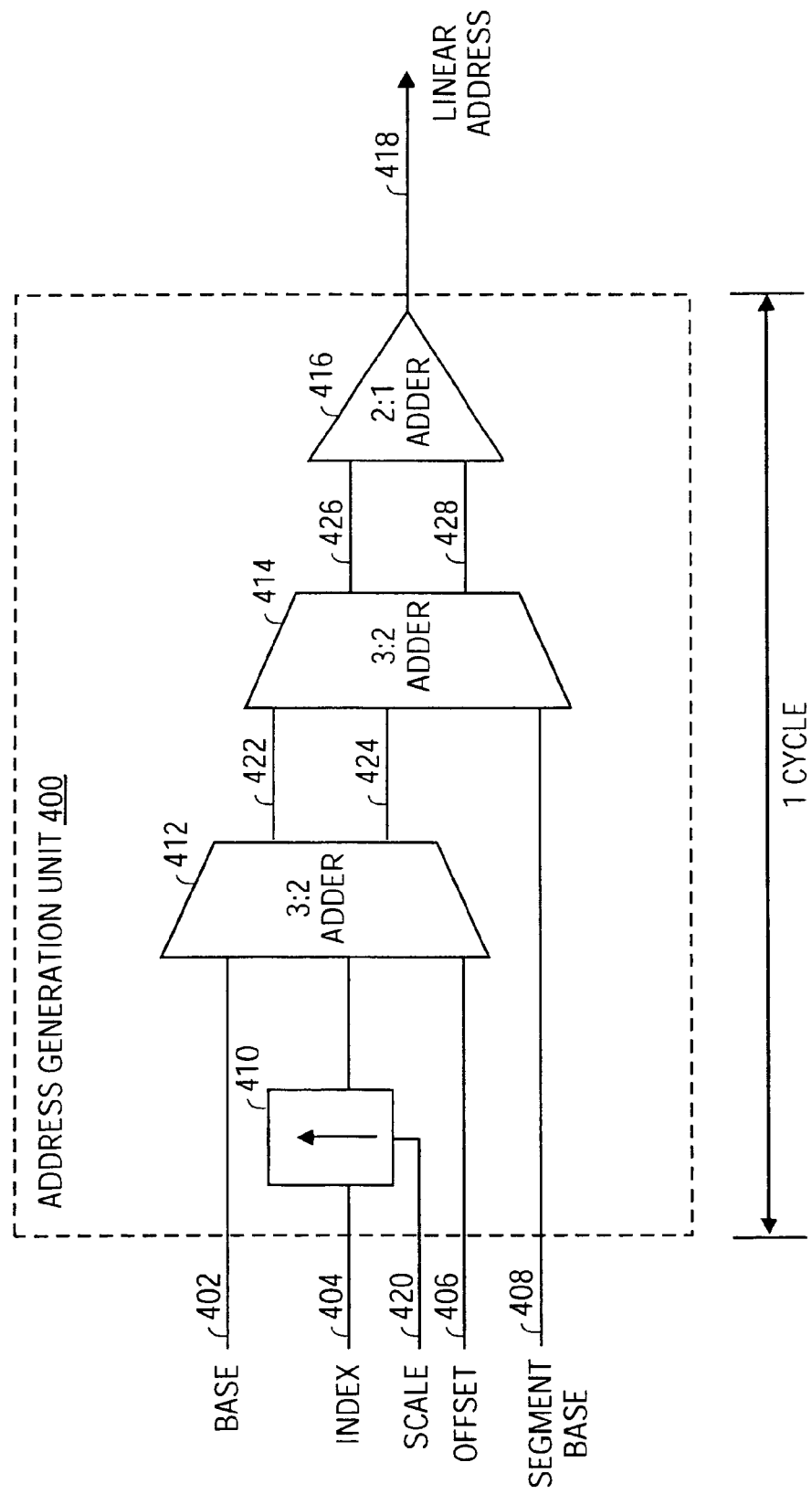
FIG. 4 shows a block diagram of a conventional single-cycle address generation unit.

FIG. 3 depicts portions of a processor 102 implementing a dual-cycle address calculation arrangement according to one embodiment of the invention. The processor 102 includes an address generation unit (AGU) 104, a cache memory 106, a load scheduler 306 and a bus controller 308. An external bus 108 interconnects the processor 102 with other components such as a main memory 116 and other devices. Numerous other functional elements of the processor 102 are, for clarity and brevity, not illustrated within FIG. 3. Rather, FIG. 3 merely illustrates a limited number of functional components sufficient to describe the operation of the AGU 104 to perform dual-cycle address calculation.

The load scheduler 306 includes a number of entries 328-1 through 328-3 (labeled 328 collectively) and can schedule multiple instructions at one time. Each entry 328 may be populated by a number of fields 334 through 342 including a base field 334 and an index field 336 to store information relating to two sources (Index 202 and Base 226) needed during the address computation operation. Base and Index fields 334, 336 may each include a ready bit 338, 340 that indicate when the corresponding source is ready. The load scheduler 306 determines when a load instruction can be dispatched by performing a data dependency check and checking to determine whether the required address components are available.

Also included in the processor 102 is a register file 302 having a number of registers to store data, including address components. The register file 302 receives source addresses 322, 324 associated with index and base registers and destination address 326 from the load scheduler 306 and sends the data associated with the source addresses to the AGU 104.

For each load instruction loaded in the load scheduler 306, it waits for signals that indicate when the Index 202 and Base 226 required by the load operation will become available. When the load scheduler 306 receives signals via an internal bus 310 indicating that all the data required by a particular load instruction is ready, it will dispatch the load operation. For example, when the Index 202 is ready, information 354 relating to the Index may travel to the load scheduler 306 through the internal bus 310 which specifies the location of the index register containing the value of the Index 202 and that the Index is ready. When the load scheduler 306 receives the index information 354, it will mark the corresponding ready bit 340 as being ready. Similarly, base information 352 may also travel to the load scheduler 306 along the internal bus 310, specifying the location of the base register and when it is ready. When both ready bits 338, 340 are ready, the load scheduler 306 may dispatch the corresponding load instruction.

As mentioned above, the Index 202 is received by the AGU 104 during the first clock cycle and the Base 226 is received during the second clock cycle. Since the Index 202 and Base 226 are received during different clock cycles, delay stages are incorporated into the processor 102 to properly schedule and dispatch the load operation. In one embodiment, a first delay stage 314 is added the base output 322 of the load scheduler 306 so that the value of the Base 226 outputted by the register file 302 will be delayed by one clock cycle. According to one embodiment, only the Index 202 needs to be available in the register file at the time load operation is dispatched. Because the Base 226 is not needed by the AGU 104 until one clock cycle after the load operation has been dispatched. In this regard, the first delay stage 314 serves to ensure that the two sources arrive at the AGU 104 at the different times.

Additionally, because the AGU 104 needs the Index value 202 before the Base value 226, the load scheduler 306 needs to wait proper amount of time before it dispatches the load operation. Accordingly, in one embodiment, a second delay stage 312 is added to the index input 318 of the load scheduler to delay the execution of the load operation by one clock cycle after the index information 354 is provided by the internal bus 310. Since Index value needs to be updated in the register file 302 before address computation can take place, the second 312 delay stage ensures that the corresponding load operation is not dispatched before the Index value is ready in the register file. It should be noted it is not necessary to add a delay stage at the index output 324 of the load scheduler 306 because the Index value will be available in the register file 302 when the load operation is dispatched. Further, it is not necessary to add a delay stage to the base input 316 of the load scheduler 306 to delay the Base information 352 being forwarded to the load scheduler 306 because the Base 226 is not needed until one clock cycle after the Index 202 is received by the AGU 104.

In operation, the execution core of the processor 102 generates and dispatches instructions (also referred to herein as micro-operations or "micro-ops"), such as load operations that use index addressing. Although the execution core may generate other micro-ops that use index addressing, only load micro-ops will be considered herein in detail. The information relating to the load micro-op (Load) dispatched by the execution core is placed into one of the entries 328 contained in the load scheduler 306. The ready bits 338, 340 corresponding the Load will generally be set to zero when it is placed in the load scheduler 306. When data required by a Load operation is generated, the data travels along an internal bus 310 and is written into the register file 302. This causes the corresponding ready bit 338 or 340 in the load scheduler 306 associated with the Load operation to be set high to indicate that the data is ready.

Before the execution of the Load operation, the Base and Index values are generated via some sort of micro-ops. For example, if there is an Add operation in the execution pipeline that will produce the Index value required by the Load operation, the load scheduler 306 needs to wait until the Add operation is completed before dispatching the Load operation since the result of the Add operation is needed during the address computation. When the Add operation is completed, the result is written into a designated index register in the register file 302. Information 354 relating to the Index travels to the load scheduler 306 via the internal bus, specifying the location of the index register containing the Index value and when it is ready. Similarly, base information 352 may also travel to the load scheduler 306 through the internal bus, specifying the location of the base register and when it is ready.

When the ready bits 338, 340 corresponding to a load operation indicate that both sources are ready and there is a sufficient bandwidth to execute the load operation, the load scheduler 306 will dispatch the load operation to execution by first sending the source and destination addresses 322–326 to the register file 302. The information contained in the index field 336 and the base field 334 of an entry 328 in the load scheduler 306 is sent to the register file 302 so that it will look up those values and send them to AGU 104. Index source address information 350 from the load scheduler 306 specifies which register in the register file 302 contain the Index value corresponding to the dispatched load operation. The register file 302 uses the index source address information 350 to look up the index value and submit it to the AGU 104. Then, one cycle later because of the delay 314, base source address information 348 from the load scheduler 306 is used by the register file 302 to look up the base value and submits it to the AGU 104. Accordingly, the AGU 104 will receive the value of the Base 226 one clock cycle after it has received the corresponding index value. Additionally, when the load scheduler 306 dispatches the load operation, it will also send decoded information to the AGU 104 via a decoder 304, such as the type and address size of the load operation.

Based on input signals read from the register file 302 as specified in the load instruction, the AGU 104 generates an address to the location in memory at which the desired data is stored. In accordance with an embodiment of the present invention, the AGU 104 adds the Segment base, Index and Offset during the first clock cycle and adds the Base to the first summation during the second clock cycle. Once the linear address has been generated by the AGU 104, the linear address is sent to the cache memory 106. If the requested data resides in the cache memory 106, then the data is written to the destination register in the register file 302 as specified in the destination address 356. However, if the requested data is not present in the cache memory 106, then the memory request is sent to the main memory 116 to obtained the desired data. Subsequently, the data returned to the processor is written to the destination register in the register file 302 as specified in the load instruction.

While the invention has been described in terms of several embodiments, those skilled in the art will recognize that the invention is not limited to the embodiments described, but can be practiced with modification and alternation within the spirit and scope of the appended claims. The description is thus to be regarded as illustrative instead of limiting.

What is claimed is:

1. An address generation unit comprising:
   a first adder to add a product of an index and a scaling factor to an offset and a segment base during a first clock cycle; and
   a second adder to add output of the first adder with a base during a second clock cycle.

2. The address generation unit of claim 1, wherein the first and second adders are pipelined such that when one address computation has completed a first stage and moves on to a second stage, a second address computation may begin the first stage.

3. The address generation unit of claim 1, wherein address generation operation is scheduled such that the operation can begin one cycle before the base value is ready.

4. The address generation unit of claim 1, wherein each of said first and second adders are embodied in the form of a 3:2 adder.

5. The address generation unit of claim 4, further comprising a 2:1 adder to receive outputs of the second 3:2 adder and output a linear address.

6. The address generation unit of claim 2, further comprising a buffer coupled between the first and second adders to store the outputs of the first adder so that during the second clock cycle, the first stage of the pipeline is able to start executing the next address generation operation while the original operation proceeds to the second stage.

7. A processor comprising:
   an execution core;
   a register file;
   a scheduler coupled to said execution core and said register file; and
   an address generation unit (AGU) coupled to said scheduler to generate a linear address based on instructions received from said scheduler, said AGU including a first adder to add a product of an index and a scaling factor to an offset and a segment base during a first clock cycle, and a second adder to add output of the first adder with a base during a second clock cycle.

8. The processor of claim 7, wherein said scheduler is a load scheduler having index and base inputs and index and base outputs.

9. The processor of claim 8, further comprising a first delay stage is added the base output of the load scheduler so that the base information received by the AGU is delayed by one clock cycle.

10. The processor of claim 8, further comprising a second delay stage added to the index input of the scheduler to delay dispatching of the load operation until the index is available in the register file.

11. The processor of claim 7, wherein address generation operation is scheduled such that the operation can begin one cycle before the base value is ready.

12. The processor of claim 7, wherein each of said first and second adders are embodied in the form of a 3:2 adder.

13. The processor of claim 12, further comprising a 2:1 adder to receive outputs of the second 3:2 adder and output a linear address.

14. The processor of claim 7, further comprising a buffer coupled between the first and second adders to store the outputs of the first adder so that during the second clock cycle, the first stage of the pipeline is able to start executing the next address generation operation while the original operation proceeds to the second stage.

15. A method comprising:
   first adding a product of an index and a scaling factor to an offset and a segment base during a first clock cycle; and second adding the result of the first adding with a base during a second clock cycle.

16. The method of claim 15, wherein said first adding defines a first stage of address generation operation and said second adding defines a second stage of the address generation operation.

17. The method of claim 16, further comprising pipelining the address generation operation such that when one address computation has completed the first stage and moves on to the second stage, a second address computation may begin the first stage.

18. The method of claim 15, further comprising scheduling address generation operation to begin one cycle before the base is ready.

19. The method of claim 16, wherein said first adding is accomplished by a first 3:2 adder and said second addition is accomplished by a second 3:2 adder.

20. The method of claim 19, further comprising receiving outputs of the second 3:2 adder and outputting a linear address.

21. The method of claim 19, further comprising storing outputs of the first adder so that during the second clock cycle, the first stage of the pipeline is able to start executing the next address generation operation while the first operation proceeds to the second stage.

* * * * *